United States Patent
Stervik

(10) Patent No.: US 8,608,617 B2
(45) Date of Patent: Dec. 17, 2013

(54) METHOD AND DRIVE TRAIN FOR PERFORMING A GEAR SHIFT IN A VEHICLE

(75) Inventor: Hans Stervik, Kärna (SE)

(73) Assignee: Volvo Lastvagnar AB, Göteborg (SE)

( * ) Notice: Subject to any disclaimer, the term of this patent is extended or adjusted under 35 U.S.C. 154(b) by 724 days.

(21) Appl. No.: 12/936,519

(22) PCT Filed: May 9, 2008

(86) PCT No.: PCT/SE2008/000323
§ 371 (c)(1),
(2), (4) Date: Oct. 6, 2010

(87) PCT Pub. No.: WO2009/136819
PCT Pub. Date: Nov. 12, 2009

(65) Prior Publication Data
US 2011/0034296 A1    Feb. 10, 2011

(51) Int. Cl.
*F02D 23/00*    (2006.01)
(52) U.S. Cl.
USPC ................... 477/32; 477/3; 477/5
(58) Field of Classification Search
USPC ................... 477/3, 5, 32
See application file for complete search history.

(56) References Cited

U.S. PATENT DOCUMENTS

| | | | |
|---|---|---|---|
| 6,022,290 A | 2/2000 | Lyon | |
| 6,322,476 B1 | 11/2001 | Kahlon et al. | |
| 6,692,406 B2 | 2/2004 | Beaty | |
| 8,196,688 B2 * | 6/2012 | Wallner | 180/65.265 |
| 8,251,865 B2 * | 8/2012 | Kaltenbach et al. | 477/5 |
| 8,257,223 B2 * | 9/2012 | Kaltenbach et al. | 477/5 |
| 8,290,654 B2 * | 10/2012 | Becker et al. | 701/22 |
| 2001/0021682 A1 | 9/2001 | Urasawa | |
| 2002/0065168 A1 | 5/2002 | Kima | |
| 2005/0054480 A1 | 3/2005 | Ortmann et al. | |
| 2007/0095584 A1 * | 5/2007 | Roske et al. | 180/65.2 |
| 2011/0137505 A1 * | 6/2011 | Stervik et al. | 701/22 |
| 2011/0144884 A1 * | 6/2011 | Miah | 477/32 |

FOREIGN PATENT DOCUMENTS

EP    1669638 A2    6/2006
JP    2004324436 A    11/2004

OTHER PUBLICATIONS

International Search Report for corresponding International App. PCT/SE2008/000323.
International Preliminary Report on Patentability for corresponding International App. PCT/SE2008/000323.

* cited by examiner

*Primary Examiner* — Derek D Knight
(74) *Attorney, Agent, or Firm* — WRB-IP LLP

(57) ABSTRACT

A method and drive train for performing a gearshift from a first gear to a second gear in a vehicle provided with a manual or automated manual transmission is provided. A drivetrain incorporating the automated manual transmission includes an engine, connected via a clutch to an electric motor/generator, which in turn is connected to the manual or automated manual transmission and wherein the electric motor/generator is connected to a battery, other energy storing devices or a heating element. The method includes controlling the motor/generator to absorb a torque equalling the torque provided by the engine, such that the manual or automated manual transmission transfers a only minor, or no, torque, disengaging the first gear, controlling the torques absorbed by the motor/generator and provided by the engine such that an engine speed correlates to the engine speed necessary for propelling the vehicle at the second gear, and engaging the second gear.

9 Claims, 1 Drawing Sheet

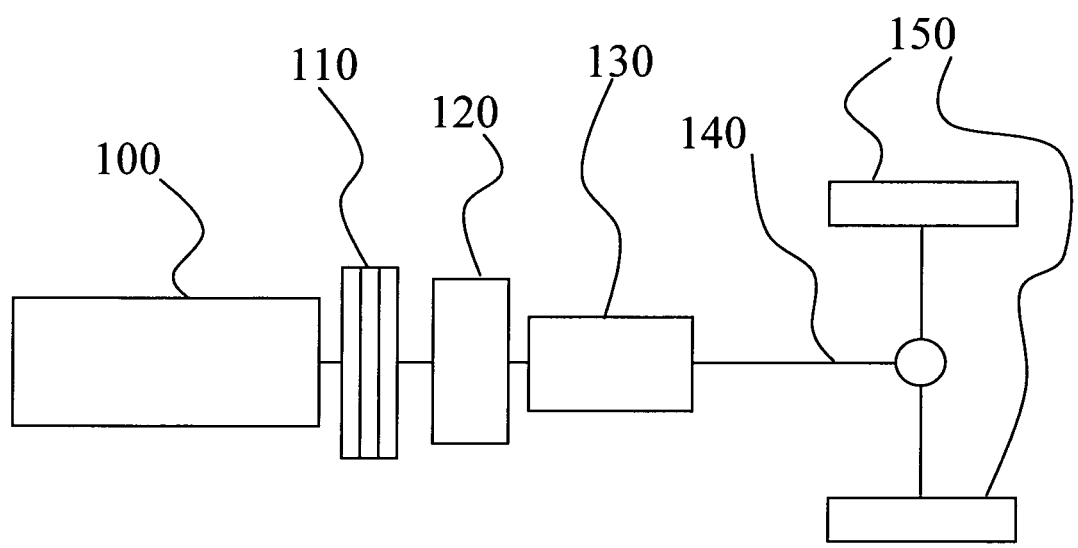

METHOD AND DRIVE TRAIN FOR PERFORMING A GEAR SHIFT IN A VEHICLE

BACKGROUND AND SUMMARY

The present invention relates to a method and a drive train for performing a gearshift in a vehicle provided with a manual transmission or an automated manual transmission. A drivetrain incorporating said transmission comprises an engine, connected via a clutch to the transmission. An electric motor/generator is drivingly connected to said drivetrain and arranged between said clutch and said transmission or between said combustion engine and said clutch. The electric motor/generator is connected to an energy storing means and/or an energy consumer.

Automated manual transmissions for various kinds of vehicles are well known by persons skilled in the art. Such transmissions are more or less identical to manual transmissions, but clutch operation and gear shift operation have been automated.

One problem, common for both manual and automated manual transmissions, is that the power transfer from engine to drive wheels is interrupted during a gear change. Except for the loss of torque during the gear change, the power transmission interrupt is problematic especially for turbo-charged engines, since the turbo pressure is lost during the power interrupt. The loss of turbo-pressure is detrimental to emissions and fuel economy, and also prolongs the period during which the driver is unable to control the engine to supply the driving wheels with sufficient driving torque.

In the known prior art, similar problems have been addressed in several patent documents. For example, U.S. Pat. No. 6,022,290 relates to a power transfer system reducing the torque loss experienced during a gear shift. The system includes an epicyclic gearset for providing a drive torque to the drive wheels during a gear shift of the automated manual transmission. The system is aimed towards providing the drive wheels with a torque during gear shift operations of the automated manual transmission via a parallel propulsion force way to the wheels. U.S. Pat. No. 6,022,290 also relates to an electronic throttle control reducing engine power output during the gearshifts.

U.S. Pat. No. 6,135,913 is a divisional application stemming from U.S. Pat. No. 6,022,290; its scope of protection includes that some kind of energy reservoir should be used for providing the driving wheels with torque during gearshift operations.

EP 1 669 638 relates to a transmission system comprising a first and a second transmission. An electromagnetic brake, the purpose of which is to engage the second transmission during a gearshift of the first transmission, is provided to engage and disengage the second transmission.

Lastly, US 2002/0065168 relates to a transmission connected to a first prime mover (an engine) and a second prime mover (an electric motor). The engine and the motor are arranged such that the motor provides the transmission with a drive torque during gearshifts.

Although some of the above mentioned arrangements in said patent documents might solve the problem with loss of turbo pressure during a gear shift, the proposed solutions are all very complicated; rather than addressing the problem with loss of turbo pressure, they address the problem with loss of drive torque during the gear shift.

One purpose of the present invention is to provide a method for at least avoiding an unloaded super charger during a gearshift of an automated manual transmission.

An aspect of the invention solves this problem by providing a method comprising the steps of controlling the motor/generator to provide a torque equalling or at least equalling the torque provided by the combustion engine, such that the manual transmission or the automated manual transmission transfers an only minor, or no, torque, disengaging presently engaged gear with a first gear ratio, controlling the torques provided by the motor/generator and the engine such that a rotational speed of said combustion engine correlates or almost correlates to a rotational speed necessary for propelling the vehicle at a selected new gear with a second gear ratio, and engaging said new selected gear.

In order to use the energy provided by the motor/generator during the gearshift, the electrical energy produced by the motor/generator could be transferred to an energy storage means and/or an energy consumer.

The energy storage means can be a battery or a capacitor. If for example the battery should be fully loaded, the electrical energy produced by the motor/generator could be transferred to an energy consumer, such as a heating element.

In order to reduce risk of overheating the heating element, the heating element could be cooled by the vehicle's cooling system.

Three of the major benefits of aspects of the present invention are;

the ability to avoid a super charger of said combustion engine being unloaded during said gearshift, when said clutch is disengaged, or to adapt a turbo pressure of a super charger of said combustion engine during the gearshift to said new selected gear that will be engaged, or to maintain a turbo pressure of a super charger of said combustion engine during the gearshift, when said clutch is disengaged.

In a further aspect of the invention injection timing or ignition timing of fuel injected in the combustion engine during the gearshift will increase the turbo pressure for a specific engine load.

BRIEF DESCRIPTION OF THE DRAWINGS

Hereinafter, the invention will be described with reference to the single appended drawing, FIG. 1, which is a schematic view showing a driveline of a parallel hybrid system.

DETAILED DESCRIPTION

With reference to FIG. 1, a hybrid system of parallel type comprises a combustion engine 100 (e.g. a diesel or petrol engine), a clutch 110, an electric motor/generator 120, a step geared transmission 130 and a driveshaft 140, being connected to drive wheels 150, 150'. Different gear ratios are selectable and engageable in the transmission in a known way.

The engine 100 is connected to the drive wheels 150, 150', such that a rotational movement of an outgoing shaft of the engine is transferred via the clutch 110, the transmission 130 and the driveshaft 140 to the drive wheels 150, 150'. The electric motor/generator 120 have dual purposes, namely to assist the engine when its torque is not enough and also to charge, for example, a battery pack in situations where an engine brake is required (e.g. in downward slopes and during deceleration) or when the torque requirement of the drive situation is such that the engine is required to deliver only a limited torque for propelling a vehicle; in such situations, the engine's fuel efficiency could be dramatically enhanced by loading the engine with the motor/generator in generator mode, i.e. such that the engine's torque partly is used to charge batteries. The electrical energy stored in the batteries can subsequently be used to assist the engine by running the electric motor/generator as a motor in case the engine needs assistance with providing torque to the drive wheels.

Another possibility is to use the energy stored in the batteries for driving the vehicle without help of the engine.

A typical way of operating a hybrid system according to the above is as follows:

When the vehicle is about to start, either or both of the engine and the motor/generator can be used for providing the necessary take-off torque. However, if the engine should be used for take-off, it is necessary to disengage the clutch, i.e. interrupt the torque transfer from the engine 100 to the transmission 130, during vehicle standstill, and slowly engage the clutch 110, such that the vehicle has a speed corresponding to the rotational speed of the engine at the chosen gear before the clutch is fully engaged.

For a gear change, it is necessary to disengage the clutch; if a gearshift operation is performed in a transmission transferring a torque, the transmission is worn very rapidly. During the clutch disengagement, the engine is throttled (in the case of a petrol engine) or controlled to decrease the amount of fuel that is injected into the cylinders of the engine in the case of a diesel engine, if the throttling or decrease of fuel injection is not timed with the disengagement of the clutch, the engine speed will either increase rapidly, causing excessive engine wear, noise and increased emissions if the throttling or decrease in fuel injection is too late, or cause a rapid vehicle deceleration in the case of a too early throttling or decrease of injected fuel.

As a result of the throttling or reduction of fuel injection, a possible turbocharger arranged for supercharging the engine will lose turbo pressure. As well known by persons skilled in the art, it takes a certain time until the turbo pressure is restored. This means that the power of the engine will be significantly reduced for a certain time period after the clutch has been reengaged. All in all, it is a time consuming process to shift gear, especially if the engine 100 is provided with a turbocharger.

According to an aspect of the invention, however, gearshifts are performed without disengaging the clutch. This is performed by controlling the motor/generator such that it gives a torque corresponding to the torque supplied by the engine, but the torque from the motor/generator should act in the opposite direction as compared to the torque supplied by the engine.

If the engine torque is low, it might be sufficient to control the motor/generator 120 to provide maximum charge current to the batteries, but in case the batteries are fully loaded, one embodiment of the present invention is to provide an electrical load in form of a energy consumer, such as a heating element, in which electrical energy produced in the motor/generator is transformed to heat. Although this embodiment at a first glance seems highly inefficient, due to the fact that mechanical energy from the engine is wasted in a heating element, one should bear in mind that the time for completing a gearshift is short (about 1 second); the short time will reduce the amount of energy that is wasted.

Moreover, even if energy is "wasted" in a heating element (that might be cooled by the engine's cooling system) this energy is partly or fully recovered by positive effects, wherein the most significant positive effect is that the turbo pressure could be at least avoided being lost or even maintained at approximately the same level during the gearshift. This effect leads to an increased power and fuel efficiency of the engine immediately after the clutch has been engaged after the gear switch operation.

In a further aspect of the invention super capacitors can be used as an electrical load and an energy consumer instead of or in parallel with mentioned batteries and/or heating element.

The method according to an aspect of the invention can he used in combination with a so called AMT, or automated manual transmission. This also includes a clutch 110 that is automated. The engine, the clutch, the motor/generator and the transmission can be controlled by one or several control units (not shown). Thus, the control unit can be programmed/arranged to perform the steps according to the different embodiments aspects of the invention. The method according to an aspect of the invention can also be used in a parallel hybrid drive train where the transmission and/or the clutch is/are manually controlled by the driver, thus, only the engine and the motor/generator are controlled by said control unit (or units).

The function and design of AMT-transmissions, manual transmissions, clutches, engines and motor/generators as such are well known by persons skilled in the art, and will hence not be described further.

To conclude, below, a complete driving sequence for a hybrid system based on a turbocharged combustion engine and using the method according to the present invention will be described:

1. When the vehicle is in a standstill position, the engine 100 can be either shut off or running at idle mode; if the engine is idling, either the clutch 110 is disengaged or the transmission 130 is put in a neutral position, no transfer of torque from the engine 100 to the transmission drive wheels 150, 150' occurs.
2. When the driver decides it is time to start, the clutch is disengaged and a first gear is engaged (which not necessarily must be the gear with the highest gear ratio). Two strategies can be chosen: according to a first take-off strategy, the engine 100 is not used; instead, all necessary torque is supplied by the motor/generator 120. According to the first take-off strategy, it is irrelevant whether the engine is idling or shut off, since the clutch is disengaged for this strategy. According to a second take-off strategy, the engine is running, and the clutch is moved from the disengaged state to an engaged state, i.e. the "normal" way to take off with a vehicle provided with an automated manual transmission or a manual transmission. For the second take-off strategy, the motor/generator 120 might be controlled to provide a torque to the transmission, hence increasing vehicle acceleration. It is also possible to use a combination of the first and second strategies, such that the initial take off torque is provided by the motor/generator 120; when the vehicle has reached a certain speed, the clutch is engaged, such that the engine 100 assists in providing the torque necessary for accelerating and propelling the vehicle.
3. When the vehicle has reached a speed where the engine 100 has an engine speed that is too high for providing optimum fuel economy, it is time to shift gear, such that the engine can run at a more beneficial engine speed. As mentioned earlier, it is crucial for a manual or automated manual transmission that the torque transferred by the transmission is zero, or close to zero, during a gearshift operation. This is, however, not the entire truth; in order to disengage a gear, it is sufficient that the torque transferred by the transmission is zero, but for engaging the subsequent gear, the rotational speeds of the incoming and outgoing shafts must match or at least almost match. This enables:
   a. That the first gear can be swiftly disengaged, and
   b. That a subsequent selected new gear can be swiftly engaged.

It should, however, be noted that the required rotational speeds of the incoming shaft in order to provide for a swift gear change are not equal for engagement of all subsequent gears; in the case of a vehicle acceleration, which means that the gearshifts will be from a lower gear (higher gear ratio), i.e. a gear giving a high engine speed for a given vehicle speed, to a higher gear (lower gear ratio), i.e. a gear giving a lower engine speed for a given vehicle speed, the engine speed required for engaging the subsequent new gear is lower than the engine speed required for disengaging the prior gear. In case the gearshift takes place during a vehicle deceleration, the rotational speed of the incoming shaft must be higher than the speed of the incoming shaft during the disengagement of the prior gear.

4. For the actual gearshift, the fuel supply to the engine 100 is decreased, such that the torque supplied by the engine 100 is controlled to be lower than a torque that can be absorbed by the motor/generator 120. Shortly thereafter, or simultaneously, the motor/generator is controlled to supply a corresponding torque (or almost corresponding torque), in a direction opposite to the torque supplied by the engine. This will minimize the torque in the manual or automated manual transmission to zero or almost zero, such that the present gear can be disengaged.

5. After the disengagement of the first gear, the system comprising the engine 100 and the motor/generator 120 is controlled such that the rotational speed of the engine (and hence the speed of the motor/generator 120) correlates or almost correlates with a rotational speed of the engine suitable to propel the vehicle at the subsequent selected new gear at the present vehicle velocity; if the gear shift concerns a gearshift from a lower gear with higher gear ratio to a higher gear with lower gear ratio, the rotational speed of the engine suitable for the subsequent selected new gear is lower than the rotational engine speed used for the first gear, and vice versa.

The method according to an aspect of the invention can be used during all kinds of gear shifts (up shifts and down shift, range gear shifts, non-sequential shifts) where the engine produces positive torque.

Some very beneficial effects can be obtained by using the method according to an aspect of the invention, compared to using the prior art method:

Firstly, the loss of turbo pressure can at least be avoided. According to one aspect of the invention the turbo pressure can be maintained during a gearshift. This makes it possible for the engine to provide full torque almost immediately after the gearshift, that is, immediately after the selected new gear has been engaged.

According to a further embodiment the turbo pressure can be adapted during the gearshift to the new gear that soon will be engaged. Said control unit can be programmed to estimate demanded torque for said new gear and the turbo pressure can be adapted accordingly by controlling said engine 100 and said motor/generator 120.

According to the prior art, the turbo pressure was lost during the gearshift, and it took a considerable time to recreate a turbo pressure sufficient for enabling full engine performance.

Secondly, the gearshifts can be performed more rapidly, since the engine torque and the turbo pressure do not need to be built up from a lower level to the same extent after a gear shift. This counts for both up shifts and down shifts.

The two first benefits are especially important should the vehicle travel in an upward slope; the rapid gearshift will reduce the loss of vehicle speed during gearshift, and the rapid recovery (or rather lack of loss) of turbo-pressure will result in a higher ratio of full engine power usable for propelling the vehicle.

Thirdly, clutch wear can be reduced. This will make it possible to use a less wear resistant clutch, which in turn means that the clutch can be made lighter.

According to prior art when a vehicle equipped with an automated manual transmission accelerates at low gears the engine will produce torque to the driven wheels during short periods of time at each gear step (during each engaged gear period). The engine will usually not have the time to reach maximum torque before it is time to decrease the torque again in order to reach zero or almost zero torque in the transmission. Therefore usually the engine only reaches approximately 60% of its maximum possible output torque during each of the engaged gear time periods. With the aspects of the invention said 60% can be increased, depending of the design of the motor/generator, to up to close to 100% of maximum possible engine output torque, thanks to the quicker response of an motor/generator compared to a combustion engine. The result is a better vehicle acceleration.

According to prior art the engine can be controlled such that the torque is ramped down before a clutch disengagement and ramped up after a clutch engagement in such a way that the driver experiences a softer gear shift procedure with minimal jerking. According to a further aspect of the invention said motor/generator can be used to better control such corresponding torque down/up ramps since it is easier to control the torque output of a motor/generator and it has a quicker response compared to an engine.

Moreover, an aspect of the invention offers a more environmentally safe solution. As well known by persons skilled in the art, the time period during which the turbo-pressure is built up, is very sensitive when it comes to soot production; the engine inducts considerably less air than when there is turbo-pressure, and despite this, large amounts of fuel must be injected, in order to rapidly regain turbo-pressure. This problem is more or less obviated by the present invention.

As mentioned above, it is beneficial lithe motor/generator, when used as a generator, can provide a torque that is about as large as the torque provided by the engine. One problem connected to such a high torque provided by the motor/generator is that the generator during a short time will produce significant amounts of electrical energy. As well known by persons skilled in the art of batteries, charging batteries with high power (i.e. current) might ruin the batteries. One possible solution to this problem might be to use a capacitor for short time storage of the electrical energy produced by the motor/generator during the gearshift operation. After the gearshift, the energy stored in the capacitor could either be transferred to the batteries (if they need to be charged) or be used in the motor/generator to propel the vehicle.

One further measure that can be taken in order to keep at least some turbo pressure during the gear shift is to postpone the ignition timing (for gasoline engines) or the fuel injection timing (for diesel engines). It is well known by persons skilled in the art that such postponements will increase the exhaust temperature from the engine without significantly increasing the engine's torque. As a result, an increase of the energy available for the turbo can be achieved. This measure might be advantageous if the maximum torque that can be absorbed by the motor/generator 120 would be significantly lower than the torque that can be provided by the engine 100; if the torque absorbable by the motor/generator 100 is low compared to the engine's maximum torque, it might be difficult to maintain the turbo pressure if the engine should he operated with "standard" injection timing, i.e. an injection timing tuned for maximum engine performance. Postponement of the injection may in such cases provide the turbocharger with sufficiently energy dense exhausts, without exceeding the maximum torque absorbable by the motor/generator 120.

Said super charging of said combustion engine can be performed by using an exhaust driven turbo or using a compressor mechanically connected to and driven by said engine directly or by using a turbo compound system (see for example U.S. Pat. No. 5,884,482).

The embodiments of said invention can also be applied to a drive train where the electric motor/generator is arranged between the combustion engine and the clutch, that is for example a drive train equipped with an ISG (Integrated Starter Generator).

As could be understood, a person skilled in the art may modify the above exemplary embodiments, without departing from the scope of the invention such as it is defined by the appended claims.

The invention claimed is:

1. Method for performing a gearshift in a vehicle provided with a manual or automated manual transmission, wherein a drivetrain incorporating the automated manual transmission comprises a combustion engine connected via a clutch to the manual or automated manual transmission, and an electric motor/generator drivingly connected to the drive train and arranged between the clutch and the transmission or between the combustion engine and the clutch, and where the electric motor/generator is further connected to an energy storing means and/or an energy consumer, the method comprising:
   i. controlling the motor/generator to absorb a torque equalling or almost equalling the torque provided by the combustion engine, such that the manual or automated manual transmission transfers a only minor, or no, torque,
   ii. disengaging a gear with a first gear ratio,
   iii. controlling the torques absorbed by the motor/generator and provided by the combustion engine such that a rotational speed of the combustion engine correlates or almost correlates to a rotational speed necessary for propelling the vehicle at a new selected gear with a second gear ratio, and
   iv. engaging the new selected gear,
   wherein the engine and the motor/generator are controlled in such a way as to avoid a super charger of the combustion engine being unloaded before, during and after the gearshift.

2. The method according to claim 1, comprising delaying an injection timing or ignition timing for the engine during the prior steps i. to iv.

3. The method according to claim 1, wherein the engine and the motor/generator are controlled in such a way as to adapt a turbo pressure of the super charger of the combustion engine during the gearshift to the new selected gear that will be engaged.

4. The method according to claim 1, wherein the engine and the motor/generator are controlled in such a way as to mainly maintain a turbo pressure of the super charger of the combustion engine before, during and after the gearshift.

5. The drive train as defined in claim 1 further comprising a control unit for controlling at least the engine and the electric motor/generator, wherein the control unit is arranged to perform the steps of claim 1.

6. The drive train as in claim 5, wherein the motor/generator is arranged to transfer electrical energy, produced by the motor/generator, to the energy storing means and/or an energy consumer.

7. The drive train as in claim 6, wherein the energy storing means is at least one of a battery or a capacitor.

8. The drive train as in claim 6, wherein the energy consumer is a heating element.

9. The drive train as in claim 5, wherein the drive train is a parallel hybrid where propulsive power from the combustion engine is arranged to reach driven wheels of the vehicle via one way through the clutch, the motor/generator and one selected gear ratio of several in the transmission.

* * * * *